United States Patent [19]

Phillips

[11] Patent Number: 4,668,715

[45] Date of Patent: May 26, 1987

[54] RAPID SOLUBILIZATION OF DRY POLYMERS

[75] Inventor: Kenneth G. Phillips, River Forest, Ill.

[73] Assignee: Nalco Chemical Company, Oak Brook, Ill.

[21] Appl. No.: 804,967

[22] Filed: Dec. 5, 1985

Related U.S. Application Data

[63] Continuation-in-part of Ser. No. 715,720, Mar. 25, 1985, abandoned, which is a continuation-in-part of Ser. No. 666,868, Oct. 31, 1984, abandoned, which is a continuation-in-part of Ser. No. 235,292, Feb. 17, 1981, abandoned.

[51] Int. Cl.$^4$ .............................................. C08K 9/04
[52] U.S. Cl. .................................. 523/205; 210/728; 210/734; 523/333; 524/110; 524/375; 524/916; 524/922; 524/555
[58] Field of Search ................ 210/702, 729, 732–734, 210/738, 728; 523/200, 205, 207, 333, 336, 337; 524/110, 375, 916, 922, 555

[56] References Cited

U.S. PATENT DOCUMENTS

| Re. 28,474 | 7/1974 | Anderson et al. | 260/29.6 H |
|---|---|---|---|
| Re. 28,576 | 10/1975 | Anderson et al. | 260/29.6 H |
| 3,171,805 | 3/1965 | Suen et al. | 210/734 |
| 3,259,570 | 7/1966 | Priesing et al. | 210/734 |
| 3,278,506 | 10/1966 | Chamot et al. | 260/89.7 |
| 3,418,237 | 12/1968 | Booth et al. | 210/734 |
| 3,657,182 | 4/1972 | Jolly | 260/29.6 PM |
| 3,806,485 | 4/1974 | Frisque | 524/916 |
| 3,852,234 | 12/1974 | Venema | 260/29.6 H |
| 3,960,584 | 6/1976 | Savage | 524/922 |
| 3,977,971 | 8/1976 | Quinn et al. | 210/732 |
| 4,052,353 | 10/1977 | Scanley | 260/29.6 PM |
| 4,118,355 | 10/1978 | Vorchheimer | 260/29.6 H |
| 4,252,706 | 2/1981 | Phillips et al. | 260/29.6 PM |
| 4,325,861 | 4/1982 | Braun et al. | 523/205 |
| 4,525,509 | 6/1985 | Hunter et al. | 524/141 |
| 4,525,515 | 6/1985 | Peignier et al. | 524/922 |

FOREIGN PATENT DOCUMENTS 1397933  6/1975  United Kingdom .

OTHER PUBLICATIONS

*The Atlas HLB System*, 4th Printing, Atlas Chemical Ind., Inc, 1963.

Primary Examiner—Peter Hruskoci
Attorney, Agent, or Firm—John G. Premo; Anthony L. Cupoli

[57] ABSTRACT

A method of rapidly dissolving finely divided individual particles of water-soluble vinyl addition polymers which comprises adding to water which contains from 0.5 to 10% by weight of a water-soluble surfactant, dry particles of a vinyl addition polymer, which particles have been coated with an oil-soluble emulsifier to provide a discrete organic solvent-free coating about such individual particles, having an HLB value between 4 and 9.

2 Claims, No Drawings

RAPID SOLUBILIZATION OF DRY POLYMERS

This application is a continuation-in-part of copending application, Ser. No. 715,720, filed Mar. 25, 1985 now abandoned, which, in turn, is a continuation-in-part of application, Ser. No. 666,868, filed Oct. 31, 1984, now abandoned, which, in turn, is a continuation-in-part of application, Ser. No. 235,292, filed Feb. 17, 1981, now abandoned.

INTRODUCTION

It is known that dry particles of water-soluble polymers are difficult to dissolve in water in a short period of time. Complete dissolution often requires periods of time ranging from as little as 30 minutes up to many hours.

The dissolution rate in water of these polymers is dependent upon numerous factors such as the chemical composition of the polymer, its molecular weight, and its particle size. As a general rule, the greater the molecular weight, the longer will be its dissolution time. Also, the less polar or ionic the charge of the polymer and the greater its polymer size, the longer it will take to dissolve.

Difficulty in dissolving these polymers is typically illustrated by the dissolution times required to completely dissolve acrylamide polymers which have a molecular weight in excess of 1,000,000.

If it were possible to provide a method for rapidly dissolving particles of water-soluble vinyl polymers, a rapid advance in the art would be achieved.

THE INVENTION

A method of rapidly dissolving finely divided individual particles of water-soluble vinyl addition polymers which comprises adding to water which contains from 0.5 to 10% by weight of a water-soluble surfactant, dry particles of a vinyl addition polymer, which particles have been discretely coated with an oil-soluble emulsifier to provide a discrete coating about such individual particles, having an HLB number between 4 and 9.

The Water-Soluble Vinyl Polymers

Typical polymers that may be used in the practice of the invention include the homo- and copolymers of acrylamide and acrylic acid. In the case of acrylamide polymers, it includes homopolymers of acrylamide as well as copolymers of acrylamide with other water-soluble vinyl monomers, which copolymers may contain between 5-95% by weight of acrylamide. Similarly, acrylic acid polymers include the homo- and copolymers of acrylic acid, particularly its water-soluble salts, e.g. sodium acrylate. The copolymers may contain between 5-95% by weight of acrylic acid or its soluble salts. Thus, the expression "acrylamide polymers" or "acrylic acid polymers" include those homo- and copolymers thus described.

While the acrylamide and acrylic acid polymers represent a large share of polymers used in many industrial applications, other polymers capable of use are described in the following United States patents: U.S. Pat. No. 3,418,237, U.S. Pat. No. 3,259,570, and U.S. Pat. No. 3,171,805.

In the practice of the invention, it is customary to treat dry polymer particles having a molecular weight of at least 1,000,000 or more. This is so because polymers having a low molecular weight normally dissolve quite rapidly whereas polymers having higher molecular weights take protracted periods of time for complete dissolution to be achieved. Therefore, the present invention contemplates employing in its practice water-soluble vinyl polymers which have a molecular weight of at least 1,000,000. The invention is advantageous in aiding in the dissolution of polymers having molecular weights ranging from 1,000,000 up to as high as 20,000,000 or more.

The Oil-Soluble HLB Emulsifier

The oil-soluble emulsifiers may be classified by using the Atlas HLB System. This system is described in the publication entitled, *The Atlas HLB System*, 4th Printing, Atlas Chemical Industries, Inc., Wilmington, Del. © 1963. This publication and its entire contents are incorporated herein by reference and made a part of this specification. Generally, oil-soluble emulsifiers produce water-in-oil emulsions whereas water-soluble emulsifiers produce oil-in-water emulsions.

Also, as a general rule, the HLB number of the oil-soluble emulsifier will range between 4-9. Those emulsifiers having an HLB less than 5 are preferred.

The Water-Soluble Surfactants

The water-soluble surfactant is preferably nonionic. While other water-soluble surfactants may be used which are ionic in character, e.g. anionic or cationic, they must be used with care since the ionic nature of these materials tends to interract with certain of the polymers and their ionic nature requires that their HLB be determined experimentally.

For a partial list of water-soluble surfactants that may be used in the practice of the invention, see the surfactants listed in Anderson/Frisque, U.S. Pat. No. Re. 28,474. These materials have an HLB within the range of 8-40.

The amount of surfactant in the water to allow rapid dissolution of the coated polymer particles will vary from as little as 0.01% up to about 12-15% by weight, and may contain from 0.5 to 10% by weight. 1-3% by weight is preferred. The amount of surfactant is also directly related to the type and amount of low HLB emulsifier.

The Particle Size of the Polymers

As indicated, if the starting polymer particles are relatively finely divided, they will dissolve more rapidly than large particles. As a general rule, I prefer to use as starting particles polymer particles passing through a U.S. Tyler mesh screen size greater than 50 and, preferably, greater than 100. These particle sizes may be obtained by ball milling, grinding, and the like.

Coating the Particles

The particles are conveniently coated by dissolving the low HLB surfactant in a readily vaporized organic solvent such as a low aliphatic hydrocarbon such as pentane, heptane, and the like. The particles are slurried into this solvent which contains the polymer, and after a sufficient period of agitation, the solvent is allowed to evaporate, leaving behind the polymer particles coated with the low HLB emulsifier.

The amount of emulsifier necessary to produce a satisfactory coating on the polymer particle may be as little as 0.01% up to about 20% by weight of the particles, depending on the total surface area to be coated.

Alternatively, the low HLB emulsifier may be directly spray-coated upon the particles. Other methods of providing the coating will be readily apparent to those skilled in the art.

The above procedures provide dry individual polymer particles which contain a discrete, thin coating of low HLB emulsifier on the surface of such particles. It is evident that either coating process inherently produces an organic solvent-free coating of the low HLB emulsifier on the polymer particles.

Example

To illustrate the invention, the following are given by way of example.

The polymer used was a commercial polyacrylamide having a weight average particle size of 1000μ. It was coated with 2% Span 80[1], based on polymers, and then dissolved in water which contained an equal weight of Triton X114[2] as the Span 80.

[1]Sorbitan monooleate.
[2]Nonyl phenol $R_x$ 10 moles ethylene oxide.

The results of these tests are presented below in Table I.

TABLE I

| Untreated Polyacrylamide | |
|---|---|
| Time (Min.) | % in Solution (1% Polymer) |
| 3 | 5 |
| 9 | 10 |
| 20 | 25 |
| 30 | 35 |
| 40 | 40 |
| 50 | 45 |
| 60 | 45 |
| 70 | 50 |
| 120 | 60 |
| 240 | 65 |
| 360 | 70 |

TABLE I-continued

| Treated Material (1% Active Polymer Solution) | | |
|---|---|---|
| Time (Min.) | % in Solution | After Standing 2 Days % (Min.) |
| 2 | 16.7 | — |
| 5 | — | 56.2 |
| 7 | 68.3 | — |
| 10 | — | 75.0 |
| 12 | 86.2 | — |
| 17 | — | 93.7 |
| 25 | 100.0 | — |
| 28 | — | 100.0 |

Effective of Particle Size Using material held between sieve size 75–125 with 10% Span 80 and added to 10% Triton X114 in water (1% active polymer).

| Time (Min.) | % in Solution |
|---|---|
| 3 | 96.4 |
| 6 | 100.0 |

I claim:

1. The method of rapidly dissolving a water-soluble vinyl addition polymer having a molecular weight of at least 1,000,000 which comprises adding to water which contains from 0.5 to 10% by weight of a water-soluble surfactant having a HLB number within the range of 8–40, particles of the water-soluble vinyl addition polymer having a particle size not greater than 50 mesh, which contain a discrete coating free of organic solvent consisting essentially of an oil-soluble emulsifier having an HLB number between 4 and 9, the amount of said emulsifier being about 0.01% about 20% by weight of the particles.

2. The method of claim 1 wherein the oil-soluble emulsifier has an HLB number less than 5.

* * * * *